Nov. 25, 1958
C. A. GARDENER
2,861,549
HYDRAULIC LOCKING CYLINDER
Filed March 26, 1954
3 Sheets-Sheet 1
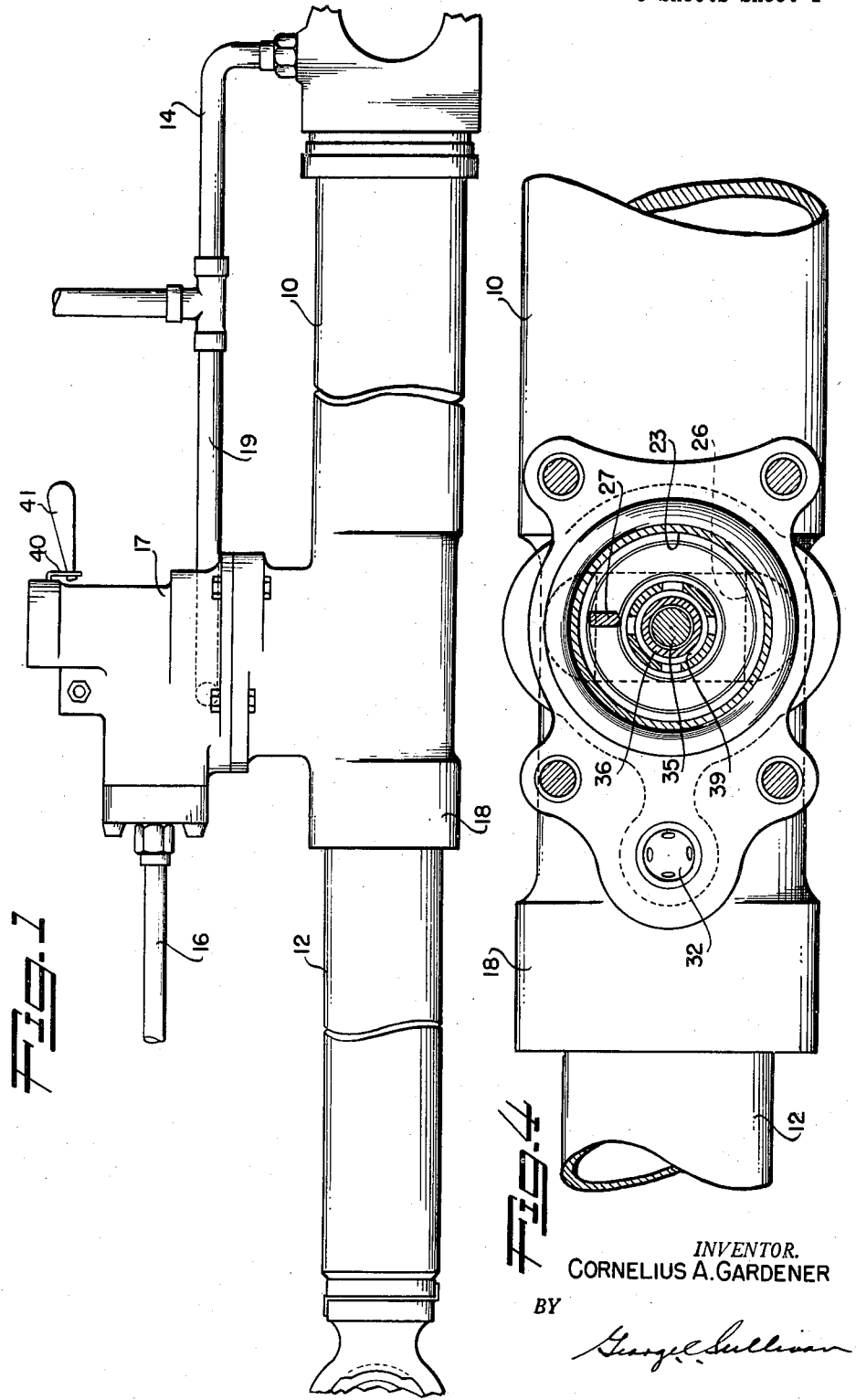
INVENTOR.
CORNELIUS A. GARDENER
BY Nov. 25, 1958 C. A. GARDENER 2,861,549
HYDRAULIC LOCKING CYLINDER
Filed March 26, 1954 3 Sheets-Sheet 2
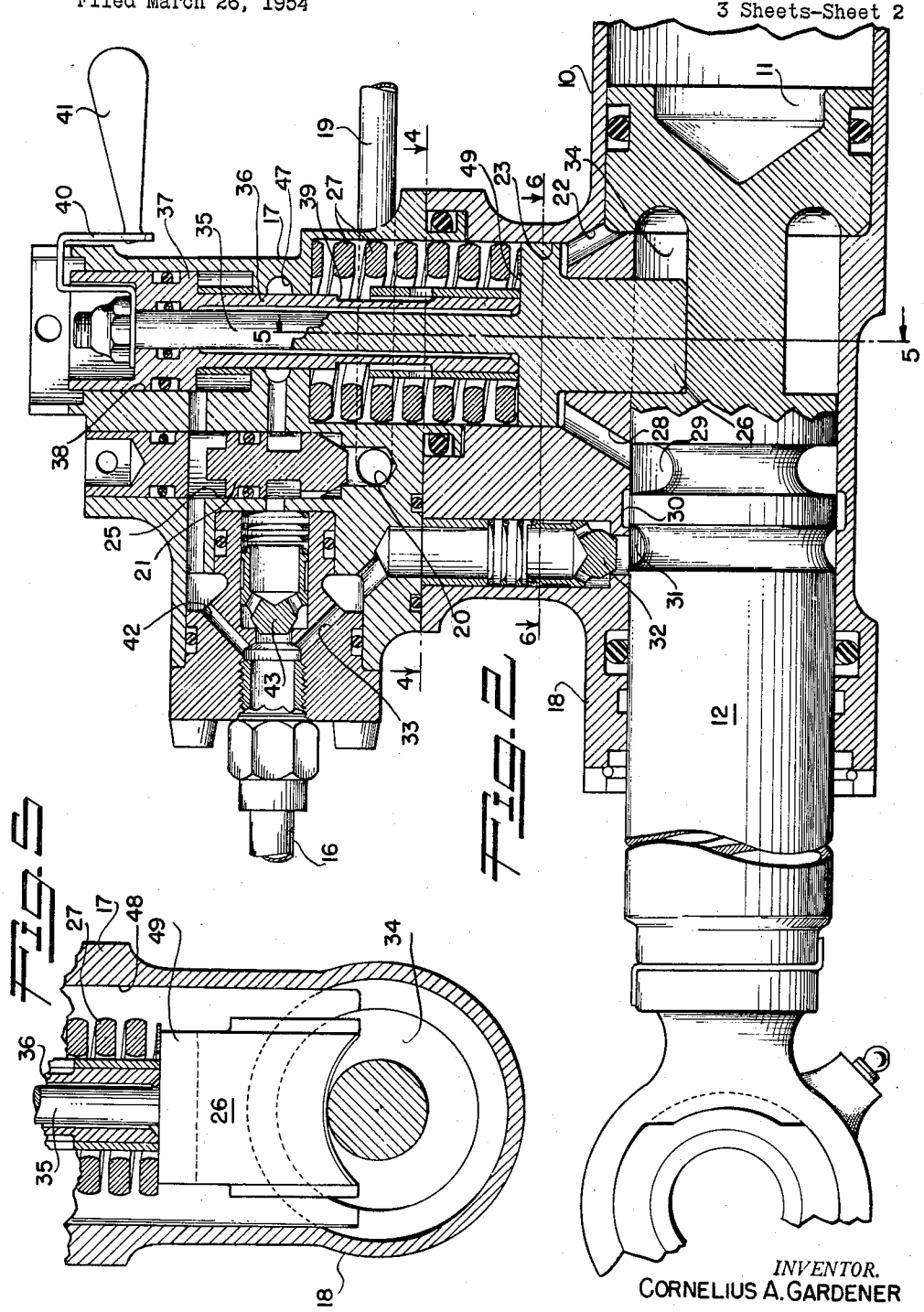
INVENTOR.
CORNELIUS A. GARDENER
BY
George C. Sullivan Nov. 25, 1958   C. A. GARDENER   2,861,549
HYDRAULIC LOCKING CYLINDER
Filed March 26, 1954   3 Sheets-Sheet 3
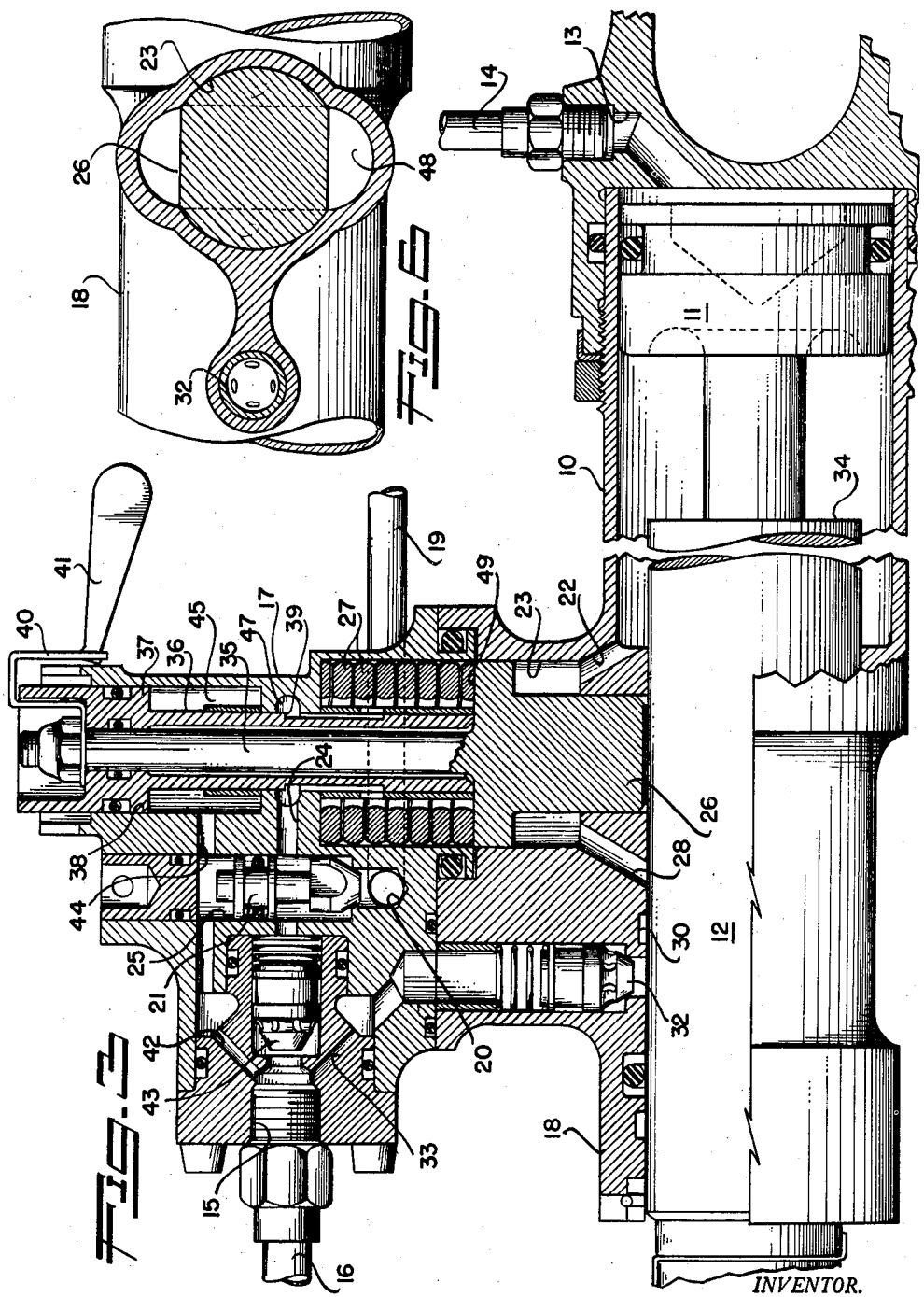
INVENTOR.
CORNELIUS A. GARDENER
BY
George A. Sullivan United States Patent Office 2,861,549
Patented Nov. 25, 1958

2,861,549

HYDRAULIC LOCKING CYLINDER

Cornelius A. Gardener, North Hollywood, Calif., assignor to Lockheed Aircraft Corporation, Burbank, Calif.

Application March 26, 1954, Serial No. 419,047

8 Claims. (Cl. 121—40)

This invention relates to a hydraulic actuating cylinder having a hydraulic lock operable automatically in sequence relative to the actuation of the cylinder.

In connection with the operation of hydraulic actuators for landing gears, doors and ramps, and other positioning controls, not necessarily limited to aircraft applications, it is the usual practice to provide locks for the extreme positions of the device being operated. For example, up and down locks are provided for landing gears, the up lock to retain the gear retracted in flight and the down lock to prevent collapse or inadvertent retraction of the gear when the weight of the airplane is supported thereon. It is an important object of this invention to provide such a hydraulic actuator with an automatically engaging mechanical lock for its extended position and to hydraulically retract or disengage said lock prior to the application of hydraulic pressure in a direction to reverse or retract said actuator.

Another object of this invention is to provide a hydraulic actuator incorporating a mechanical lock for its extended position which lock incorporates a run-around valve interconnecting the opposite ends of the actuator piston during the extension operation thereof, which run-around valve is tied in with the hydraulic engagement of the mechanical lock and is open only during the extension of the hydraulic actuator.

Another object of this invention is to provide a hydraulically sequenced combination of actuator, run-around valve and mechanical lock for the extended position of the actuator wherein the lock is hydraulically retracted prior to actuation of the retraction movement of the actuator and hydraulically held out of contact with the actuator piston rod during the movement thereof until the locking position is reached.

A further object of this invention is to provide a compact and self contained hydraulic actuator of the linear motion type incorporating a mechanical lock engaging the piston rod of the actuator in its extended position and disengaged by the application of pressure fluid to the actuator in a direction to retract the same.

Other and further objectives and features of this invention will become apparent as the following detailed description of a typical embodiment proceeds, throughout which description reference will be made the accompanying drawings wherein:

In the drawings:

Figure 1 is a side elevation of a hydraulic operating cylinder incorporating a locking cylinder embodying the features of this invention applied thereto.

Figure 2 is a longitudinal central section of Figure 1 showing the operating parts in position at the completion of the extension operation, with the lock engaged.

Figure 3 is a section similar to Figure 2 showing the operating parts in position near the completion of the retracting movement of the operating cylinder.

Figure 4 is a section on the line 4—4 of Figure 2.

Figure 5 is a section on the line 5—5 of Figure 2 showing a side view of the lock mechanism.

Figure 6 is a section on line 6—6 of Figure 2.

As shown in the drawings:

My invention is shown in connection with a hydraulic actuator comprising a cylinder 10 with a piston 11 and piston rod 12 operable therein, such as can be used for power actuation of various mechanisms for airplanes and the like such as extending and retracting the landing gear, and door ramps for cargo airplanes. The invention consists of incorporating an automatic hydraulically actuated positive lock to hold the piston at one extremity of its travel, together with a run-around valve that bypasses the hydraulic fluid from one end of the cylinder to the other to reduce the volume of fluid required to operate the actuator to that amount required by the differential area of the piston and piston rod. The lock is arranged to be automatically retracted prior to operation of the hydraulic cylinder.

Working fluid is supplied through a conventional control valve (not shown) to either an extension port 13 through a tube 14, or to a retraction port 15 through a tube 16, one of the ports 13 and 15 also serving as a return port when the other is being used as the power connection. The retraction port 15 is formed in a valve housing 17 mounted on the gland end 18 of the cylinder 10. A branch line 19 from the extension tube 14 also connects to the housing where a port 20 therein is controlled by a poppet or spool type of run-around valve 21, which interconnects the ends of the cylinder, during the extension motion of the piston, so that the differential area of the opposite sides of the piston provides the effective working area, requiring the pumping of much less fluid for extension under emergency operating conditions.

During the extension procedure the run-around poppet 21 remains open and the return flow from the piston rod end of the cylinder flows from a port 22 into a chamber 23 in the housing thence into a horizontal bore 24 into a passage 25 containing the poppet 21 and past the poppet into the tube or branch line 19 to the extension port 13. Movement of the piston 11 to the left in Figure 3 is due to the differential areas of the piston exposed to pressure since the entire run-around circuit is at the extending pressure.

The chamber 23 contains a plunger lock 26 backed by a spring 27. The plunger is normally held in its retracted position by the oil pressure in chamber 23 but as the piston and piston rod approach the end of the extension movement the fluid pressure is released through a passage 28 into a groove 29 in the piston rod, a groove 30 into the wall of the cylinder, another groove 31 in the rod and thence past a spring loaded check valve 32 and a passage 33 leading to the port 15. With the fluid so released by overlapping registration of the grooves 29, 30 and 31 the plunger lock 26 is pushed down in the chamber 23 by its spring 27 and enters a groove 34 cut in the piston rod adjacent the piston.

The plunger lock 26 has a stem 35 on which is mounted a sleeve 36 and piston 37 operating in a bore 38 aligned with the chamber 23. The sleeve 36 is cut down at 39 intermediate its length to form a passage connecting the run-around poppet bore 25 and the passage 24 to the chamber 23, when the lock 26 is retracted as in Figure 3. The piston 37 carries an external link 40 which operates an indicator lever 41 for the lock position. The indicator lever may operate a flag or a switch to turn on a colored light near the remote control valve to indicate that the down lock is engaged, as is usual practice in connection with the operation of landing gears for example.

The retraction movement of the actuator piston 11 desirably should be preceded by withdrawal of the locking plunger 26. To this end, the application of fluid pressure to the retraction port 15 is diverted through a passage 42 around a check valve 43, the passage 42 leading to the run-around poppet bore 25, where the fluid pressure pushes on the top of and holds the poppet 21 where it closes the port 20. The retraction fluid pressure flown through a passage 44 to the space 45 beneath the piston 37, to move the latter upwardly to pull the lock plunger 26 out of its groove 34 in the piston rod 12. With the lock retracted as in Figure 3, continued application of fluid pressure through the tube 16 opens the check valve 43 passing fluid into the poppet bore 25 intermediate the length of the poppet spool 21 through the hole 24 to the chamber 23 through a passage 47 uncovered by the sleeve groove 39 when the lock 26 is retracted. From the chamber 23 the fluid flows into the cylinder 10 through the passage 22 to push the piston 11 to the right in the cylinder 10.

As shown in Figures 5 and 6 the plunger lock 26 is substantially rectangular in shape, the chamber 23 therefor having side passages 48 for the flow of fluid therepast to the passages 28 from the bottom of the chamber to the cylinder 10 and rod groove 29. Immediately above the lock 26 is a spring seat or collar 49 supporting the spring 27, which collar does not block the flow of fluid therepast.

The operation of the mechanism of the invention has been followed in connection with the description of the details thereof by tracing the flow of hydraulic fluid through the device. By way of summary, the operation of extending the actuator involves the use of a control valve (not shown) which supplies fluid to the extension port 13 from a source of fluid pressure, and the branch line 19 simultaneously supplies pressure to the port 20 to unseat the poppet 21 and admit fluid to the chamber 23 of the lock 26 to relieve the spring load on the lock to hold the latter in its retracted position of Figure 3 to prevent it from riding on the finished surface of the piston rod 12 as the rod and piston 11 move to the left in the cylinder. In other words, when the piston is being extended by application of pressure at the port 13, the branch pipe 19 and port 20 apply the same pressure throughout the working cylinder area. This pressure acts on the entire area of the lock 26 except for the stem 36, this stem area unbalancing the lock and lifting the lock 26 against the spring force so that it will not ride on the piston rod. The run around passages also apply pressure to the piston 37 in the chamber 45 to lift the valve 26. Note that the lock 26 drops into its groove in the piston rod only in the fully extended position of Figure 2, and when the rod is to be retracted from this position the application of pressure through the port 16 feeds fluid into the chamber 45 to lift the piston 37 and thereby the lock. The fluid flow is from the port 15 and passage 42, across the poppet bore 25 to the chamber 45. During the extension movement of the piston in the cylinder, fluid displaced from the left side of the piston is pushed up into the chamber 23 and thence downward past the poppet valve 21 to be returned to the extension port 13 through the branch line 19, greatly reducing the volumetric demand for pressure fluid for the extension operation. Thus no provision for a sump return line is required for an emergency source of hydraulic pressure, such as a hand pump, to prevent loss of the fluid.

When the extension movement has nearly reached its limits, just before the lock 26 drops into the position of Figure 2, the piston rod grooves 29 and 31 overlap with the wall groove 30 to relieve the pressure in the chamber 23 by allowing access of fluid to the check valve 32. Relief of pressure in the chamber 23 allows the spring 27 to push the lock 26 down into its groove 34, moving the stem sleeve 36 down to cut off the run around poppet 21 from the chamber 23.

To retract the actuator from the extended and locked position of Figure 2 the control valve is operated to connect the retraction line 16 to the source of fluid pressure and the extention tube 13 is simultaneously converted into a return line to the sump or reservoir of the source of pressure fluid. The application of pressure fluid to the port 15 causes fluid to bypass the check valve 43 through the passage 42 into the top of the bore 25, where it holds the poppet 21 to its seat, and thence through the passage 44 into the space 45 below the piston 37 carried by the stem 35 of the lock 26, lifting the lock 26 out of its groove 34 in the piston rod. The upward movement of the lock stem 35 carries the sleeve 36 upwardly, registering the sleeve groove 39 with the port or hole 47 communicating through passage 46 with the poppet bore 25 and through passages 44 to the check valve, allowing the latter to open and feed pressure fluid into the chamber 23 and thence to the left side of the piston 11 to start the retraction movement thereof to the right as shown in Figure 3. With retraction pressure applied in the chamber 23 and to the left of the piston 11 the lock 26 is held in its upward position shown by unbalanced hydraulic pressures so that the lock does not ride on the piston rod surface during either the retraction or extension operation.

It will be noted that full fluid pressure exists in the space to the left of the piston during both retraction and extension and the lock 26 moves to its engaged position by releasing this pressure by the rod grooves 29 and 31 when the piston reaches full extension, and the lock is retracted prior to the admission of fluid pressure to the left side of the piston for retraction thereof.

I claim:

1. A hydraulic actuator comprising a cylinder and piston mechanism wherein the piston is carried by a piston rod for actuating a movable mechanism such as a door or landing gear, a spring urged lock movable normal to the axis of the piston rod, said piston rod having a groove therein which is in alignment with the lock when said actuator is extended, a housing for said lock attached to the wall of the cylinder, fluid circuits in said housing arranged to retract said lock, a run-around valve in the fluid circuits therein which interconnects the ends of the cylinder during the extension movement of the actuator, and means whereby such lock movement serves to admit hydraulic fluid to said cylinder in a direction to retract said piston.

2. A hydraulic actuator comprising a cylinder and piston mechanism wherein the piston is carried by a piston rod for actuating a movable member, a spring urged lock rod movable substantially normal to the piston rod, the piston rod having a groove therein in alignment with and receiving the lock when the piston rod is extended, a housing for the lock attached to the cylinder, fluid circuits in the housing arranged to retract the lock from the groove, a run-around valve in the circuits for interconnecting the ends of the cylinder during extension of the piston and rod and connected with the lock to hold the same retracted during extension movement of the actuator piston, and means whereby retraction movement of the lock serves to admit hydraulic fluid to the cylinder in a direction to retract the piston.

3. A hydraulic actuator comprising a cylinder and piston mechanism wherein the piston is carried by a piston rod for actuating a movable member, a spring urged lock movable substantially normal to the piston rod, the piston rod having a groove therein in alignment with and receiving the lock when the piston rod is extended, a housing for the lock attached to the cylinder, fluid circuits in the housing arranged to retract the lock from the groove, a run-around valve in the circuits for interconnecting the ends of the cylinder during extension of the piston and rod, hydraulic pressures serving to hold the lock withdrawn from contact with the piston rod during movements of the latter, spring means urging the lock into engagement with the piston rod, means whereby retraction movement of the lock serves to admit hydraulic fluid to the cylinder in a direction to retract the cylinder, and means to release said lock holding pressure when the piston rod reaches the limit of its outward movement to allow the spring means to move the lock into engagement with the piston rod.

4. In combination with a cylinder and piston type of hydraulic actuator wherein the piston is carried on a piston rod movable between a retracted and extended position, a locking plunger engageable with a groove in the piston rod at the extended position of the piston rod, a housing for said plunger attached to the cylinder, a spring for extending said locking plunger, a hydraulic pressure circuit in said housing for retracting said plunger, return pressure port means in the housing, and groove means in the piston rod communicating with said port means to release the hydraulic pressure retracting the lock when the piston rod reaches its extended position and thus permit the spring to actuate the locking plunger.

5. In the combination as defined in claim 4, hydraulic circuit connections to said housing for extending and retracting said piston rods, and a run-around valve in said housing for inter-connecting the ends of said cylinder, said run-around valve opening in response to the application of hydraulic pressure to extend said piston rod.

6. In the combination as defined in claim 4, hydraulic pressure port means interconnecting said retraction circuit of the locking plunger and the retraction side of the piston and so arranged as to withdraw the locking plunger prior to the application of hydraulic pressure to the piston to retract said actuator piston rod.

7. In the combination as defined in claim 4, a run-around valve in the hydraulic pressure circuit arranged to interconnect the ends of the cylinder during extension movement of the piston, and means operated by the retraction of the locking plunger to admit fluid pressure to the retraction end of the cylinder to retract the piston.

8. In the combination as defined in claim 4 means operated by the retraction of the lock arranged to admit hydraulic fluid to the retraction side of the piston in the cylinder.

References Cited in the file of this patent
UNITED STATES PATENTS

| | | |
|---|---|---|
| 1,115,605 | Snohr | Nov. 3, 1914 |
| 1,766,510 | Gregory | June 24, 1930 |
| 1,989,387 | Vickers | Jan. 29, 1935 |
| 2,181,562 | Ganahl | Nov. 28, 1939 |
| 2,342,812 | Martinson | Feb. 29, 1944 |

FOREIGN PATENTS

| | | |
|---|---|---|
| 48,981 | Sweden | Aug. 24, 1917 |